Oct. 24, 1933.　　　　F. P. FRANKFORD　　　　1,932,014
CASH FARE COIN BOX
Filed June 4, 1932　　　　7 Sheets-Sheet 1
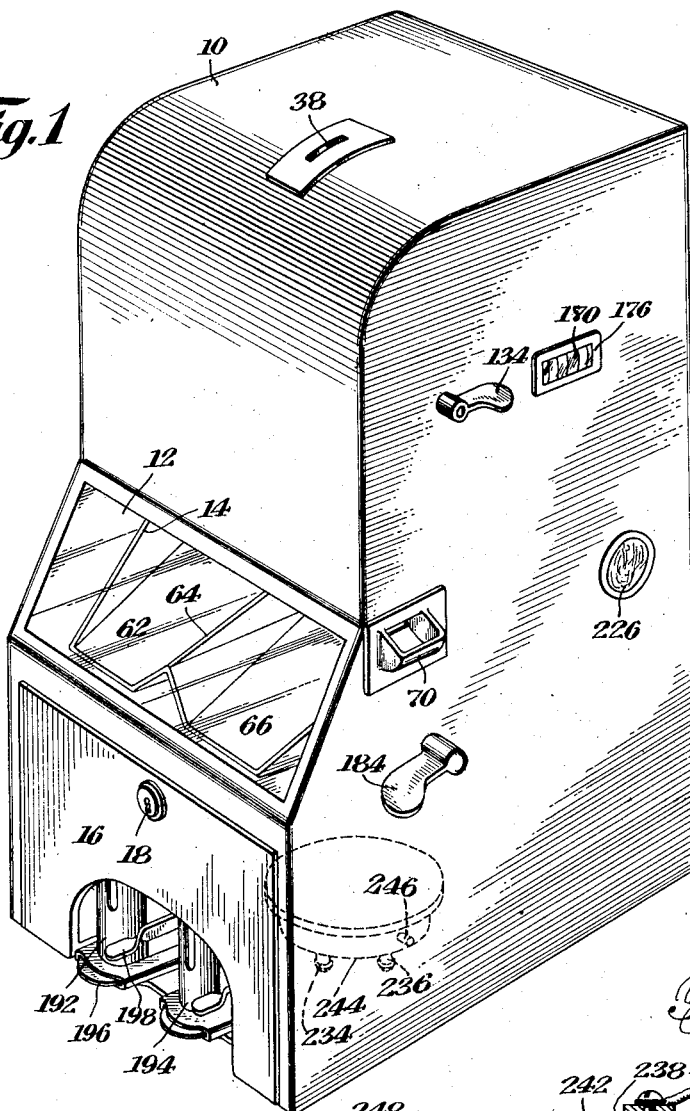
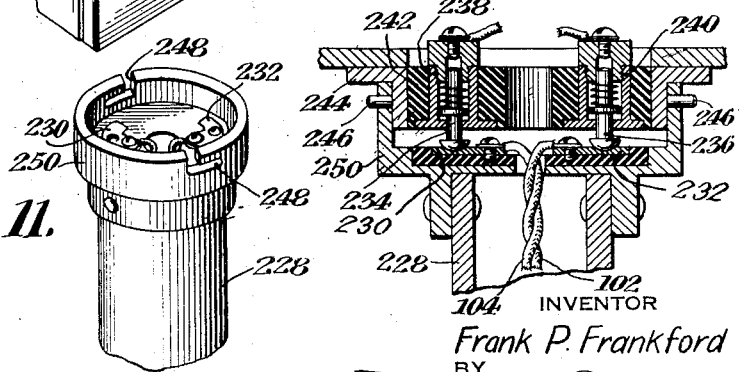
INVENTOR
Frank P. Frankford
BY
ATTORNEYS Oct. 24, 1933.   F. P. FRANKFORD   1,932,014
CASH FARE COIN BOX
Filed June 4, 1932   7 Sheets-Sheet 2

INVENTOR
Frank P. Frankford
BY
ATTORNEYS

Oct. 24, 1933.  F. P. FRANKFORD  1,932,014
CASH FARE COIN BOX
Filed June 4, 1932  7 Sheets-Sheet 3
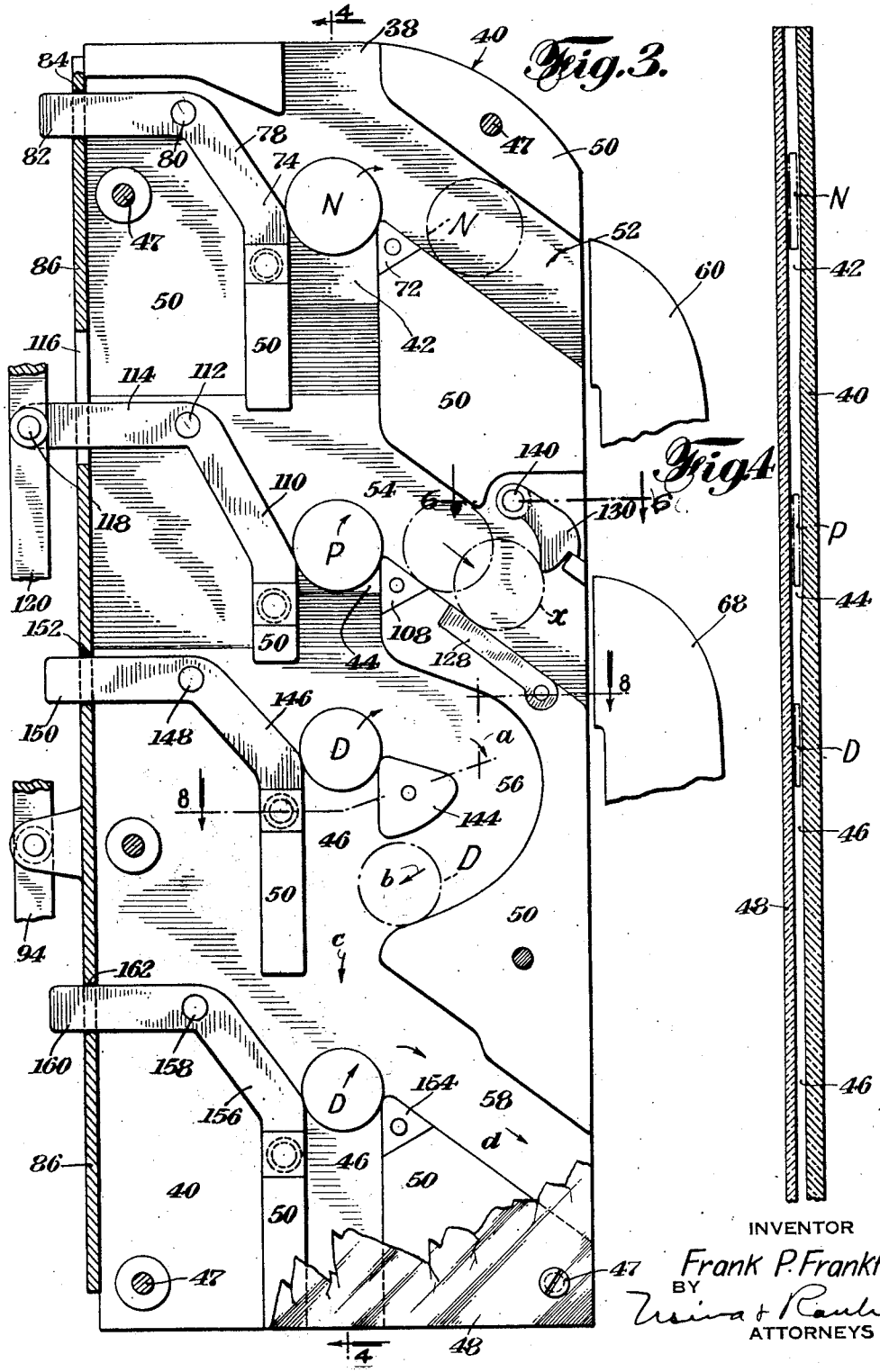
INVENTOR
Frank P. Frankford
BY
ATTORNEYS

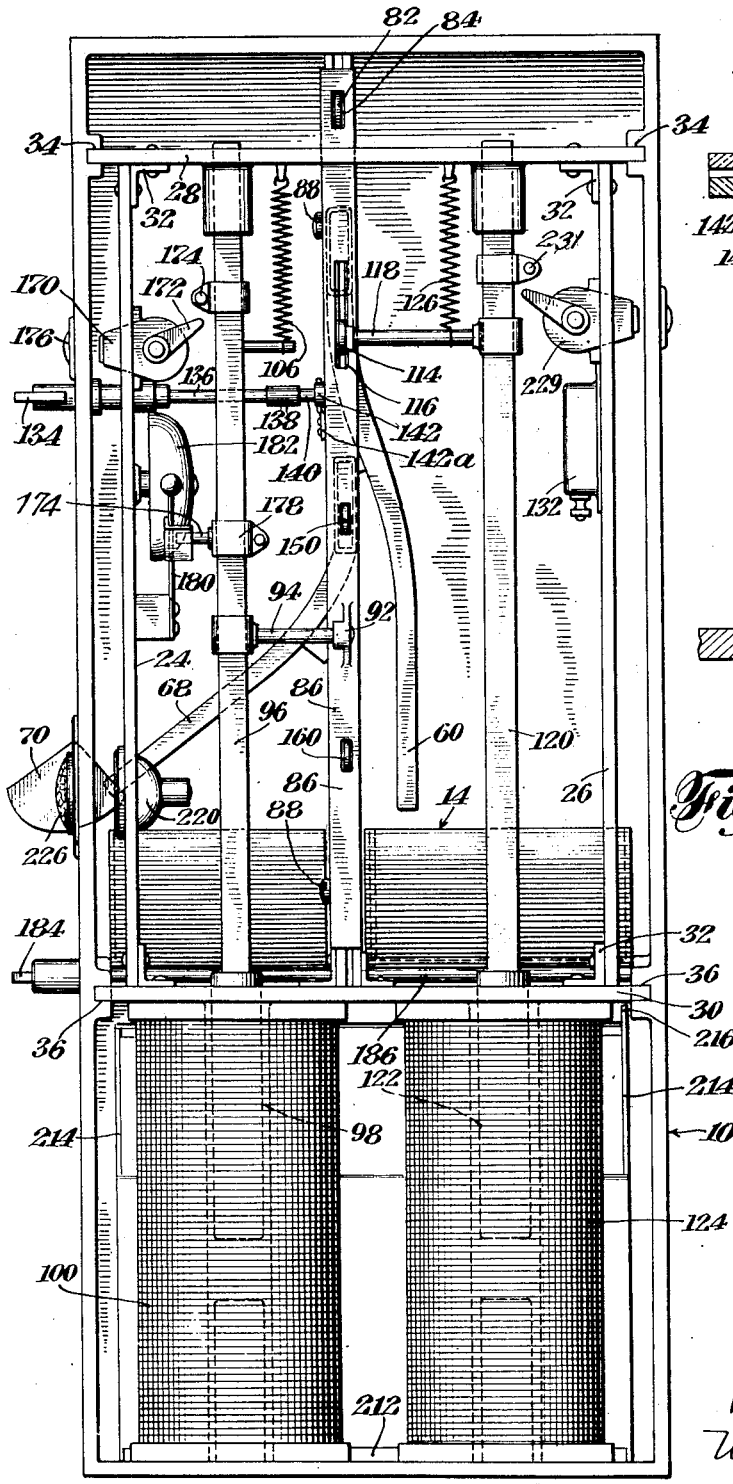
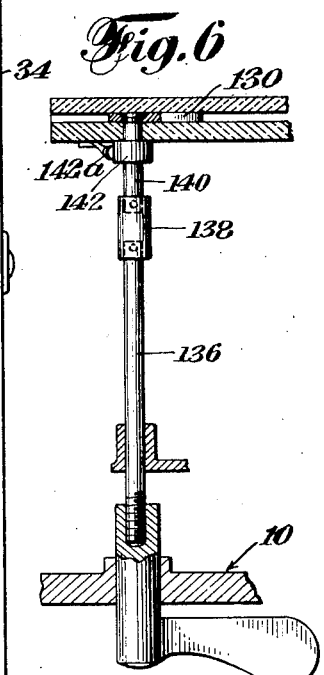

Oct. 24, 1933.　　　F. P. FRANKFORD　　　1,932,014
CASH FARE COIN BOX
Filed June 4, 1932　　　7 Sheets-Sheet 5
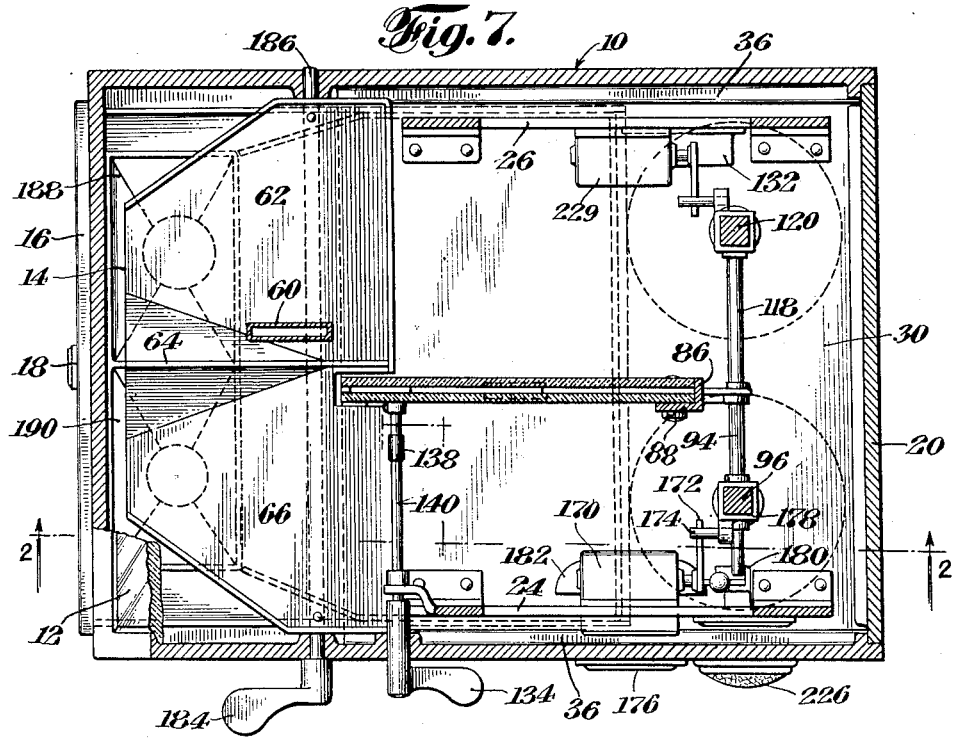
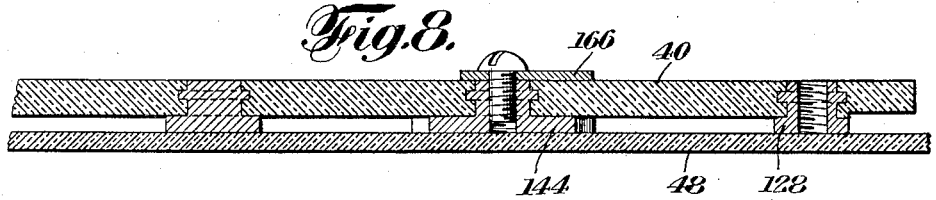
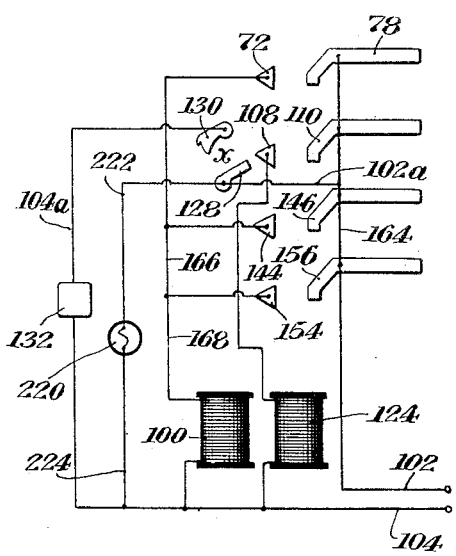
INVENTOR
Frank P. Frankford
BY
ATTORNEYS Oct. 24, 1933.    F. P. FRANKFORD    1,932,014
CASH FARE COIN BOX
Filed June 4, 1932    7 Sheets-Sheet 6
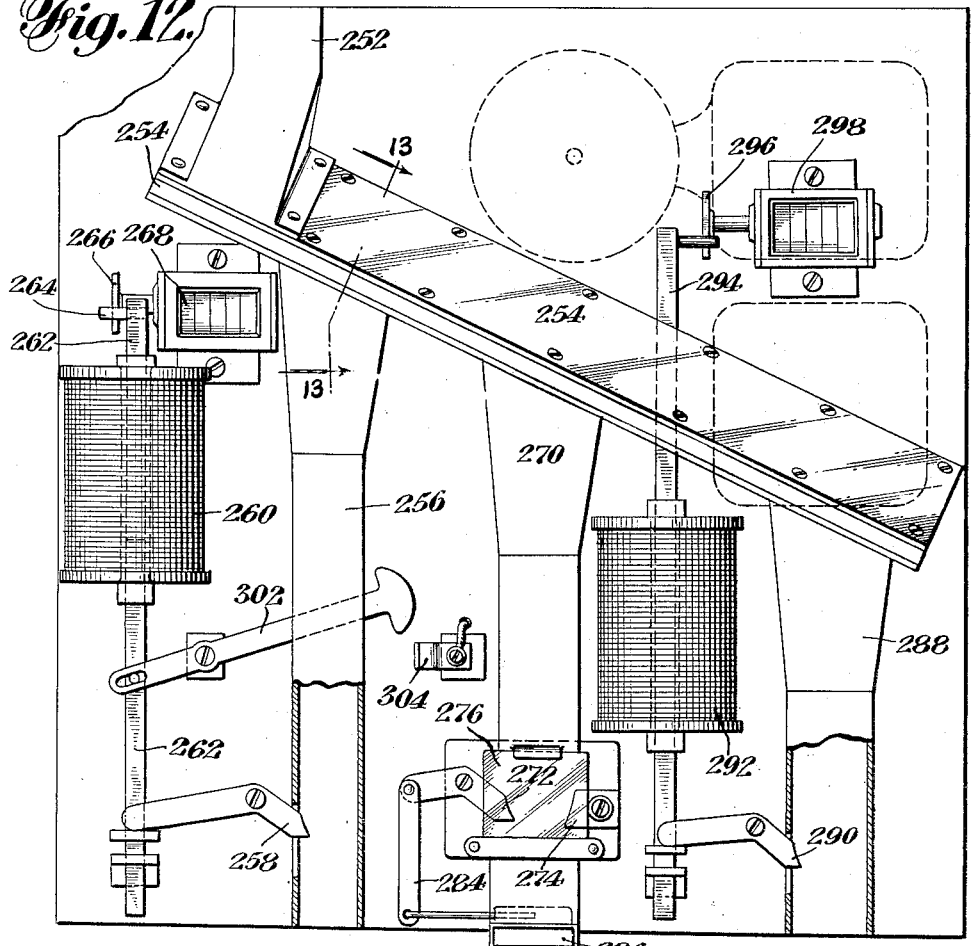
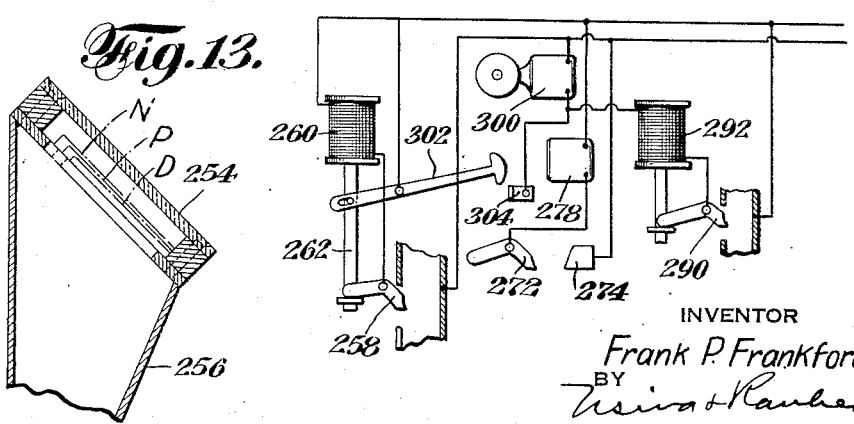
INVENTOR
Frank P. Frankford
BY
ATTORNEYS Oct. 24, 1933.  F. P. FRANKFORD  1,932,014
CASH FARE COIN BOX
Filed June 4, 1932  7 Sheets-Sheet 7

INVENTOR
Frank P. Frankford
BY
ATTORNEY

Patented Oct. 24, 1933

1,932,014

UNITED STATES PATENT OFFICE 1,932,014

CASH FARE COIN BOX

Frank P. Frankford, Ridgefield Park, N. J.

Application June 4, 1932. Serial No. 615,325

13 Claims. (Cl. 194—6)

This invention relates to improvements in cash fare boxes and aims to provide a box of this character suitable for receiving and recording motor bus or street car fares. The improved fare box includes a structure formed with a single main coin receiving slot, into which all cash fares are inserted. Branching from the main slot, there are a plurality of other slots leading to separate storage compartments. As the coins of different sizes travel by gravity along the main slot, their travel is arrested at different points in the length thereof. When the travel of the coin is arrested, an electric circuit is made, which energizes a solenoid or other suitable electric power means. This transmits motion to a kicker which is effective to transfer the coin from the main to one of the branch slots. The kickers are arranged at different points along the length of the main slot and the travel of the coins is arrested at different points. The nickels, which are of a relatively large diameter, will be stopped by the kickers at one point. One cent pieces, hereinafter referred to as pennies, will be stopped at another point. Dimes will be stopped at still another point. Each time a coin is stopped, electric means will be energized to direct the stopped coin to an appropriate branch slot, which communicates with a chute leading to a suitable coin storage receptacle.

The invention also embraces various structural features which enable the device to be inexpensively manufactured and yet perform its function efficiently. The parts are so arranged that the operating mechanism can be removed as a unit for inspection or repair. The arrangement is also designed to prevent unscrupulous persons from tampering with the mechanism in such a way that fares will not be registered and means are also provided to give an audible signal each time a fare is deposited. A signal is also included which visually indicates that the electric part of the apparatus is functioning.

These and various other features of the invention will be fully apparent from the following specification when read in connection with the accompanying drawings and will be defined with particularity in the appended claims.

In the drawings:—

Fig. 1 is a perspective view of a coin box illustrating one embodiment of the invention;

Fig. 3 is a detail view illustrating part of the structure constituting main and branch coin slots and kicker mechanism for transferring coins from the main to the branch slots;

Fig. 4 is a section on line 4—4 of Fig. 3;

Fig. 5 is a rear elevation from the right side of Fig. 2 with the back cover removed;

Fig. 6 is a detail section on line 6—6 of Fig. 3;

Fig. 7 is a horizontal section on staggered line 7—7 of Fig. 2;

Fig. 8 is a detail section through the slot structure, the view being taken on the staggered line 8—8 of Fig. 3;

Fig. 9 is a diagram showing the electrical connections for the apparatus;

Fig. 10 is a detail vertical section showing the support for the fare box and means therein for conveying electric current to the operating mechanism;

Fig. 11 is a perspective view of the upper part of the supporting member shown in Fig. 10;

Fig. 12 is a side elevation with parts broken away illustrating a modification of the invention;

Fig. 13 is a detail section on line 13—13 of Fig. 12.

Fig. 14 is a diagram of electrical connections for the apparatus shown in Fig. 12;

Figure 2:
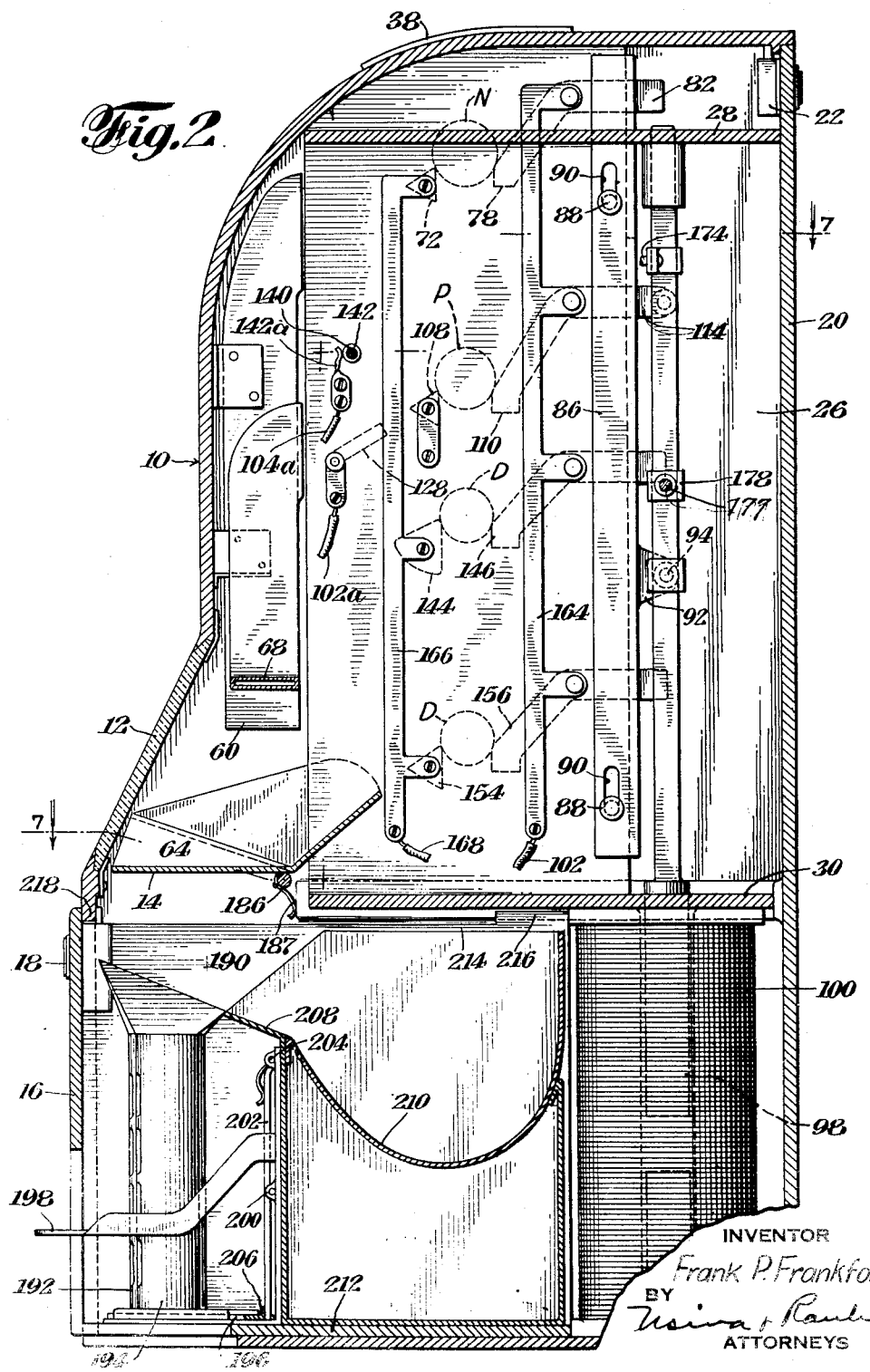
Fig. 2 is a vertical section thereof (see section line 2—2 of Fig. 7)

Referring in detail first to Figs. 1 to 11 inclusive, the improved coin box includes a casing 10 having a transparent window 12 therein for exposing to view coins which are released in a manner referred to and deposited on a tiltable tray 14. The casing has a removable front cover 16 adapted to be fastened in place by a key inserted in a suitable lock 18. There is also a rear cover 20, which is removably secured to the casing by a suitable lock 22.

Within the casing, there is a sub-assembly of parts constituting the main operating unit. This operating unit includes side plates 24 and 26 secured to top and bottom plates 28 and 30 by suitable angle brackets 32, thus forming sort of a box-like structure closed at the top, bottom and sides, but open at the front and back. This operating unit is removably secured to the casing in guide grooves 34 and 36, which are engaged by the top and bottom plates 28 and 30, respectively, as clearly indicated in Fig. 5.

Located at about midway between the plates 24 and 26, there is a slot structure forming a runway for the coins adapted to be inserted through a coin opening 38 formed in the finish plate secured to the exterior of the casing 10 (Fig. 1).

The slot forming structure, as best shown in

Figs. 3, 4 and 5, includes a plate or slab 40 of suitable insulating material such as bakelite, hard rubber, vulcanite or slate. This plate is recessed to form a main coin slot having portions 42, 44 and 46 of varying widths. Secured to the plate 40, by suitable screws 47, there is a glass or other transparent plate 48. This plate engages or fits flush against the raised portions 50 of the plate 40, so as to confine the coins within the recessed or slotted portions of the plate 40.

This plate 40 is also formed with branch slots 52, 54, 56 and 58. The branch slot 52 is adapted to direct five cent pieces, hereinafter referred to for convenience as nickels, to a chute 60, which is adapted to discharge the nickels on the section 62 at one side of a division piece 64 formed in the coin receiving tray 14 (Fig. 7).

The ten cent pieces, hereinafter referred to as dimes, which are ultimately discharged from the lower branch slot 58, fall directly on the section 66 located on the other side of the dividing ridge 64 formed in the tray.

One cent pieces, herein referred to as pennies, which are inadvertently or with fraudulent intent inserted in the opening 38 of the fare box, are arranged to be directed from the branch slot 54 to a discharge chute 68 which conveys these coins to a discharge cup 70 attached to the outer casing.

Means are provided for automatically transferring the nickels, pennies and dimes, respectively, from the sections 42, 44 and 46 of the main coin slot to the branch slots 52, 54, 56 and 58 and each time a coin is so transferred a counter is actuated. As will hereinafter more fully appear, when a nickel is transferred from the main to the branch slot, the counter is given one impulse. When a dime is inserted in the box, it is acted up twice by certain kicker mechanism to be presently described and the counter receives two impulses. Thus a single counter will serve to record the total cash fares received in the form of nickels and dimes. There is a separate counter which records the number of times pennies have been inserted.

Referring first to the means for transferring nickels from the widest portion 42 of the main slot, there is an electrical contact 72 secured to plate 40 at the point where the main slot intersects the nickel branch slot 52. The lower end 74 of a kicker 78 lies opposite the contact 72. When a nickel is inserted in the fare opening 38, it falls down through the main slot until its travel is arrested by coming in contact with the contact 72 and lower part 74 of the kicker 78. This nickel position being illustrated at N in Fig. 3. The kicker 78 is pivoted at 80 and has an arm 82 projecting through a slot 84 formed in an angle shaped bar 86 which is mounted for vertical sliding movement on studs 88 (Fig. 2) which passes through slots 90 formed in one flange of the angle bar 86. This angle bar has a rearwardly extending lug 92 (Figs. 2 and 5), carrying a pin 94, which is in turn secured to an extension rod 96 of the movable core 98 of a solenoid 100.

When a nickel N comes to rest between the contact 72 and the lower end 74 of the nickel kicker, a circuit is closed across the current supply lines 102 and 104, as will be clear from examination of the diagram Fig. 9. The closing of this circuit momentarily energizes the solenoid 100. This serves to pull down the solenoid core 98 and its extension 96, thus also moving down the angle bar 86. This in turn rocks the nickel kicker 78 about its pivot 80, thus transferring the nickel from the main slot 42 to the nickel branch slot 52, as indicated by the full and dotted lines in Fig. 3. The nickel will then roll down the inclined branch slot to the chute 60 and finally come to rest on the section 62 of the coin receiving tray. As the coin rolls away from the kicker, it will be understood that the electric circuit will be broken. The core 98 and angle bar 86 will then be lifted to normal position by a tension spring 106.

When a penny P is either inadvertently or with fraudulent intent inserted in the opening 38 of the fare box, being of a smaller diameter than a nickel, it will freely pass the nickel kicker 78 and the contact 72 without energizing the solenoid 100. As indicated in Fig. 3, the penny will come to rest when it engages the penny contact 108 and the lower end of a penny kicker 110. This kicker is pivotally mounted at 112 and its rearwardly extending arm 114 passes through an elongated slot 116 formed in the flange of the angle bar 86, so that the said bar can reciprocate up and down without moving the penny kicker.

This penny kicker is connected by means of a pin 118 with an extension 120 of a solenoid core 122 adapted to be actuated by a solenoid 124. Thus, when a penny comes to rest, as indicated in the full line position of Fig. 3, the circuit will be closed through the solenoid 124. This will cause the solenoid to pull down the extension 120 against the action of a spring 126, thus rocking the penny kicker 110 and transferring the coin from the main slot to the slot 54, as indicated by the dotted lines in Fig. 3. As the penny rolls down the branch slot, it will roll over a contact plate 128 coming to rest against a pivotally mounted contact dog 130. The dog 130 will arrest the travel of the penny and in the dotted position indicated at X in Figs. 3 and 9 a circuit will be closed by the penny through a penny buzzer 132, the contact 128 being electrically connected to the feed wire 102ᵃ and the buzzer and dog 130 being in circuit with the feed wire 104ᵃ. The sounding of the buzzer will notify the operator that an improper fare has been deposited in the box. He will thus be able to notify the passenger. And by pressing on the thumb piece 134, the operator will rock the shaft 136, which is connected by the insulating sleeve 138 with the shaft 140, which carries the dog 130. This shaft carries a ring 142 and the current is transmitted thereto by a spring contact brush 144ᵃ, this brush being connected to the wire 104ᵃ of Fig. 9. The contact 128 is connected by a wire 102ᵃ with the feed wire 102. When the operator rocks the dog 130, the penny will be released and thus roll down into the cash return cup 70.

Located below the penny contact 108, there is a dime contact 144 which lies at the intersection between the portion 46 of the main coin slot and the loop-shaped branch slot 56. Opposite the contact 144, there is a dime kicker 146 pivoted at 148 and having an arm 150 extending through a slot 152 of the vertically movable angle bar 86 above referred to. Below the contact 144, there is another dime contact 154 which lies at the intersection of the portion 46 of main coin slot and the branch coin slot 58. Opposite this there is a second dime kicker 156 pivoted at 158 and having an arm 160 extending through a slot 162 of the vertically movable angle bar 86. All of the kicker members above referred to are electrically connected to a common bus bar 164, see Fig. 2, which bus bar in turn is connected to the feed wire 102. The nickel contact 72, the dime contacts 144 and 154 are all connected to a bus bar 166, which in turn connects with a wire 168 leading to the solenoid 100, previously referred to. When the dime falls through the main coin slot, it will pass the contacts 72 and 108 and their associated kickers without closing a circuit. But, when its travel is arrested by the contact 144 and kicker 146, the solenoid 100 will be energized, thus moving the bar 96 down through connections previously referred to. This will cause the kicker to transfer the dime from the main chute to the loop-shaped branch chute 56. This coin will then follow the direction of arrows *a*, *b* and *c* and the dime will again come to rest between the kicker 156 and contact 154. The circuit will again be made through the solenoid 100 and the kicker will be actuated so as to transfer the dime to the branch slot 58. It will roll down this slot, as indicated by the arrow *d* and will fall on the section 66 of the cash tray 14, which is allotted to receive dimes.

It will be understood from the above that a dime in its travel from the point of contact 144 to the branch chute 58 will be effective to impart two down strokes to the extension 96 of the solenoid core. Each down stroke of the solenoid core extension 96 is adapted to actuate a counter 170, so as to indicate the total amount of fares collected. This counter, as indicated in Fig. 5, has an arm 172, which upon each down stroke of the solenoid core extension 96 is struck by a laterally extending pin 174 secured to a collar carried by said member 96. The counter 170 is mounted on the side plate 24 of the operating unit and the casing is provided with a window 176 so as to expose the registering wheels of the counter to view. Each time the nickel is fed to the machine, it will be understood that the counter is given one impulse, and when a dime is deposited the counter will be given two impulses. Likewise, for a nickel the movement of the member 96 will cause the pin 174 on collar 178 to give a single impulse to a hammer 180, which strikes a bell 182 secured to the side plate 24 of the operating unit. Thus when a passenger inserts a nickel the bell will ring once and when a dime is inserted, the bell will ring twice. This will audibly indicate to the bus or car operator that the proper fare has been deposited. He can also determine this by viewing the coins through the window 12 as they are deposited on the tiltable tray 14.

At frequent intervals, as the nickels and dimes accumulate in their respective sections 62 and 66, of the cash tray 14, the operator may press the thumb piece 184, so as to rock the tray supporting shaft 186 against the tension of spring 187. This will dump the coins into respective hoppers 188 and 190 leading to the nickel and dime coin storage receptacles 192 and 194, respectively. These receptacles are in the form of upright cylindrical shells, so that they will stack the nickels and dimes in an orderly fashion. At the base of each receptacle 192 and 194, there is a slide such as indicated at 196. Each slide is adapted to be reciprocated by means of a finger piece 198 pivoted at 200. The rocking movement of the finger 198 will swing a lever 202, which is pivoted at 204. This lever, at its lower end, passes through a slot in the slide 196 and also engages an abutment 206 on each slide so as to impart a reciprocating motion thereto. Each reciprocating movement of the slide will strip one coin from the bottom of the pile so as to assist the operator in making change. In the event that the coin storage receptacles 192 and 194 are allowed to fill up to capacity, the excess coins dropped in the hoppers 188 and 190 by the tilting movement of the tray will slide down the inclined plate 208 and into a till or cash box 210. The cash box 210, hoppers 188 and 190 and the coin storage receptacles 192 and 194 are all mounted on a bottom plate 212, so that they can all be slid outwardly as a unit when the door 16 is unlocked. This bottom plate 212 has upwardly extending side pieces 214, one of which has a projection 216, which is adapted to strike against the front plate 218 of the casing so as to limit the outward movement of the parts. When the bottom plate 212 is slid outwardly, it will be understood that free access may be had to the cash box 210 for the purpose of removing the money therefrom.

In order to indicate to passengers as well as to inspectors or spotters that the machine has not been rendered inoperative by interrupting the supply of electrical current, I provide a lamp 220, which is connected by wire 222 to the bus bar 164 furnishing current to the several kickers above referred to. This lamp in turn is connected in circuit with a wire 224 leading to the supply line 104. Obviously if the current supply to the kicker fingers is interrupted the light will be extinguished. This will serve to notify an inspector that the machine has been tampered with. This light 220 is adapted to shine through a lens or bulls-eye 226 secured in one of the side walls of the casing of the machine.

The fare box, as shown, is adapted to be supported on an upright post or column such as indicated in Fig. 11 at 228. This is of hollow construction, as shown in Fig. 10 and provides for housing the supply wires 102 and 104. These wires connect with contact plates 230 and 232, which in turn cooperate with spring pressed connections 234 and 236 carried in fittings 238 and 240 secured in the block of insulation 242 carried in a flanged ring 244. This ring carries radially extending pins 246 adapted to engage the slots 248 formed in a flange of the fitting 250 secured to the upper end of the column or post 228, thus making a bayonet joint so as to facilitate the removal of the cash box as a whole, so that it can be readily transferred from one bus or car to another, or to permit removal for inspection or repair.

In some cases, if desired, a separate counter 229, as shown, can be mounted on the side plate 26 and arranged to be given one impulse each time the penny solenoid 124 is energized. Such counter would be mounted in substantially the same fashion as the counter 170 is mounted and arranged to be operated by a pin 231 carried on a collar secured to the vertically movable bar 120.

In the modification of Figs. 12 to 14 inclusive, a separate register is provided for nickels and dimes. In this modification, all of the coins are inserted through a suitable slot formed in a member 252. This leads to a chute 254 which, as indicated in Fig. 12, is inclined in the direction of its length to the horizontal. This chute, as indicated in the section of Fig. 13, is also transversely inclined. As thus arranged, when a dime rolls down the chute 254, it will fall through a suitably sized opening and into a branch chute 256. In dropping through this branch chute, it will strike a finger 258 and through the connections shown in Fig. 14 will close a circuit through the solenoid 260. This will result in reciprocating a bar 262 secured to the solenoid core so as to cause pin 264 to strike an arm 266 on a dime counter 268.

When a penny is inserted in the chute 252, being of larger diameter, it will roll past the branch chute 256 until it comes into alignment with another branch chute 270 adapted to receive pennies. There will be an opening in the chute sufficient to permit the penny to drop until it comes to rest between a removable finger 272 and a fixed abutment 274 located behind a glass window 276.

When the penny contacts with the finger 272 and abutment 274, it will close the circuit through a buzzer 278. This will notify the operator. And by actuating the finger piece 280 the same can be rocked on its pivot 282, so as to lift the link 284 and thus rock the finger 272 to a position to release the penny through an outlet opening 286.

When a nickel is inserted in the chute 252, being of larger diameter than the openings in line with the dime and penny branch chutes, it will roll down until it comes to an opening in line with the nickel chute 288, the nickel travelling down this chute will strike contact finger 290 and make a circuit across this finger through a solenoid 292, as indicated in Fig. 14. This will cause the solenoid core extension 294 to be lifted so as to strike an operating finger 296 on nickel counter 298.

When the dime solenoid 260 is energized, it will be understood that it will rock the finger 258 so as to release the dime into a suitable receptacle not shown. Similarly, when the nickel solenoid 292 is energized it will rock the finger 290, so as to release the nickel. At the same time, the nickel solenoid is energized, a circuit will be made once through a bell 300. When a dime makes contact with the finger 258, it will also close a circuit through the bell. This will give one sound. Then upon movement of the solenoid bar 262, a lever 302 will be rocked. This will cause a wiping contact across a terminal 304, so the circuit will be again closed through the bell 300. Thus when a dime travels through the chute 256, the bell will be sounded twice so as to audibly inform the operator of the value of the fare inserted in the box.

Figure 15:
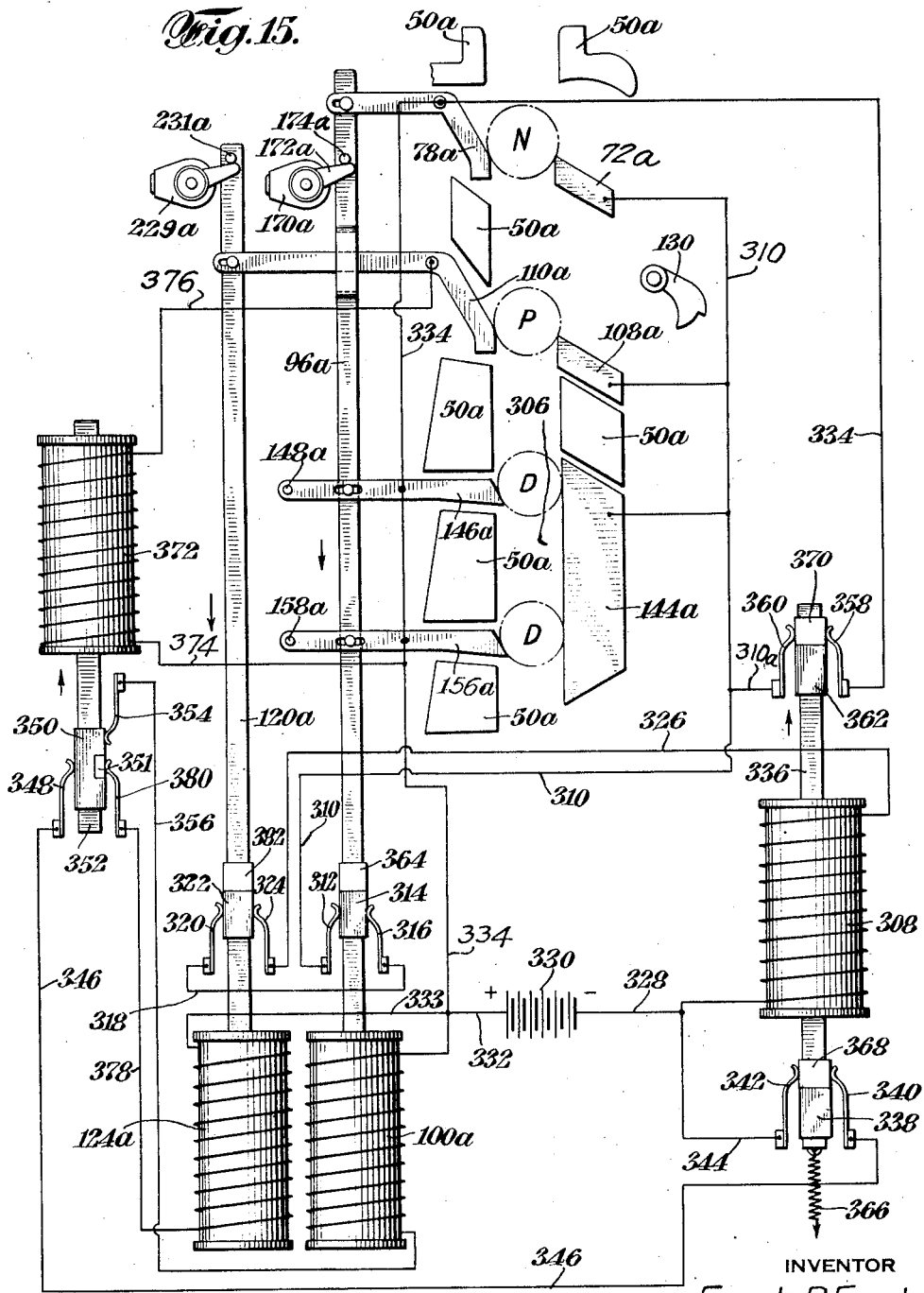
Fig. 15 is a diagrammatic view illustrating an alternative embodiment of the invention.

In Fig. 15, I have illustrated diagrammatically an alternative embodiment of the invention. The arrangement here shown, in many respects, is quite similar to the device shown in detail in Figs. 1 to 11 inclusive. For convenience in identifying the corresponding parts, the same reference numbers used in the former figures have been employed with the addition of an exponent "a". The chief difference between the embodiment shown in Figs. 10 to 12 inclusive and that illustrated in Fig. 15 is that in the former figures the circuits for energizing the solenoids 100 and 124, respectively, are both made and broken by the coins bridging the spaces between the movable kickers and certain fixed contacts. In the embodiment of the invention illustrated in Fig. 15, the coins do not directly close a circuit through the corresponding solenoids. Instead, they close a circuit through a master coil, as will be presently described and this master coil closes a circuit through the operating solenoids 100$^a$ and 124$^a$. The use of such a master coil is desirable because by its use means can be provided whereby when the coin is kicked out of or released from the main slot, there will be no arcing between the coin and the kickers or between the coin and the contacts which cooperate with the kickers to arrest the travel of the coin. The use of this master coil and related parts enables me to break the circuit at points other than those bridged by the coin, thus there will be no arcing by the coin which might tend to pit the kickers and their coacting contacts. The avoidance of such arcing and pitting is of importance because it insures that there will be no corrosion of the electrical parts which might tend to prevent a coin from closing a circuit through the kicker operating solenoid.

Referring in detail to this alternative embodiment illustrated in Fig. 15, the kicker 78$^a$ and its coacting contact 72$^a$ is substantially the same as the parts shown at 72 and 78 in Figs. 1 to 11 inclusive. The same is true of the penny kicker 110$^a$ and its coacting contact 108$^a$, although the circuit arrangements are of course modified. The dime kickers 146$^a$ and 156$^a$ move downward when the solenoid 100$^a$ is energized, the dime, therefore, is released in two steps and falls straight down instead of being transferred to a branch slot, as above described.

The main slot in Fig. 15 is defined in part by blocks of fiber or other insulating material indicated at 50$^a$ and also in part by the contact members 72$^a$, 108$^a$ and 144$^a$. The latter member is of considerable length as shown.

When the solenoid 100$^a$ is energized, it will rock the nickel kicker 78$^a$ and the two dime kickers 146$^a$ and 156$^a$. Similarly, when the penny solenoid 124$^a$ is energized, it will rock the penny kicker 110$^a$. Rocking of the nickel and penny kickers will kick these coins out of the main slot and over the abutments formed by the contacts 72$^a$ and 108$^a$ and they will thus be directed to appropriate branch slots. When the first dime kicker 146$^a$ is energized, it will release the dime so it will drop into the slot portion 306 and fall until it comes to rest against the second dime kicker 156$^a$. When this latter kicker is rocked downwardly, the dime will be released and it will then fall into a suitable guide which will carry it to the dime storage compartment.

The energization of the solenoids 100$^a$ and 124$^a$ is controlled by a master coil 308. When a nickel comes to rest between the fixed contact 72$^a$ and the nickel kicker 78$^a$, the circuit will be closed through the master coil as follows—from wire 310 to brush 312 through conducting sleeve 314 secured to and movable with the solenoid extension rod 96$^a$ through brush 316 and wire 318 to brush 320, thence through conducting sleeve 322 secured to and movable with the penny solenoid extension rod 120$^a$, thence through brush 324 and wire 326 to the one end of the coil 308, thence through the coil to wire 328 to one side of the battery or other source of electrical energy 330. From the battery 330, the current will flow by way of wire 332 to a bus bar or other conductor 334, which electrically connects the kickers 156$^a$, 146$^a$ and 78$^a$.

Closing the circuit just described will of course energize the coil 308. This will move the solenoid core extension rod 336 upward. This rod carries at its lower end a conducting sleeve 338, which coacts with the brushes 340 and 342. Movement of this conducting sleeve into contact with the brushes 340 and 342 will close a circuit through the solenoid 100$^a$, thus energizing it and causing it to pull down the extension rod 96 against the action of a spring not shown. This will kick the nickel from the main to the branch slot. The circuit made by the movement of the rod 336 through the solenoid 100$^a$ is as follows—from the battery 330, wire 328, wire 344, contact brush 342, contacting sleeve 338 on solenoid rod, contact brush 340, thence by a wire 346 to a contact brush 348 through the conducting portion of a sleeve 350 secured to a solenoid extension rod 352, which at times is actuated by an auxiliary coil 372 hereinafter referred to. From sleeve 350, the current flows to brush 354 by wire 356 through the solenoid 100ª, which is connected at the top to the wire 332 leading to the battery, thus completing the circuit.

At the same time that the master coil 308 is energized to close a circuit across the brushes 340 and 342 it also closes a circuit across brushes 358 and 360 through a conducting sleeve 362 secured to the rod 336. Closing the circuit, across these brushes 358 and 360, serves to connect the kickers 78ª, 146ª and 156ª in parallel, respectively, with the contacts 72ª, 108ª and 144ª. This provides a conducting path across the gap between the nickel and dime kickers and the contacts other than through the coin. Thus, when the circuit is broken across any kicker and its coacting fixed contact, for example, between the nickel kicker 78ª and the contact 72ª an arc will not be struck between the coin and the kicker or the coin and the fixed contact. Moreover, the parts are so arranged that when the solenoid 100ª is to be deenergized its circuit is in fact not broken by the coin, but is broken by an insulated portion 364 on the rod 96ª bridging the space between the contact brushes 312 and 316. Inasmuch as there is a sliding motion between the conducting sleeve 314 and the said brushes, arcing at this point will not be objectionable because the sliding action will tend to keep the surfaces clean and in good electrical conducting condition. It will be understood of course that because the kickers and their cooperating fixed contacts are connected in parallel across the brushes 358 and 360 that the break in the circuit for the master coil 308 takes place across the contacts 312 and 316. When this circuit is broken, a spring 366 will pull the master coil rod 336 to the full line position shown in Fig. 15 wherein the insulating sleeve 368 thereon will open the circuit between the brushes 340 and 342, thus deenergizing the solenoid 100ª and permitting it to return to the position illustrated. At the same time, the spring will cause the insulated sleeve 370 to open the circuit between the brushes 358 and 360, thus opening the circuit across the several kickers 78ª, 110ª, 146ª, 156ª and their respective coacting contacts.

In this way, the apparatus will be reset. The above disclosure describes the operation when the nickel makes a circuit across the kicker 78ª and its cooperating contact 72ª. The same action takes place each time a dime makes a circuit across the kickers 146ª and 156ª and the fixed contact bar 144ª, it being understood that for a dime, the master coil 308 and the solenoid 100ª will each receive two impulses.

The penny kicker 110ª is actuated by the solenoid extension rod 120ª which in turn is arranged to be pulled down when the solenoid 124ª is energized, a spring not shown normally holding the solenoid extension rod 120 in the position shown in full lines.

There is an auxiliary control coil 372, which controls the energization of the penny solenoid 124ª. The auxiliary control coil 372 is connected in series with the master control coil 308 and although the master control coil and the auxiliary coil 372 are in series, when a penny closes the circuit between the penny kicker 110ª and the cooperating penny contact 108ª the nickel and dime solenoid 100ª is not energized. This is because when the auxiliary coil 372 is energized an insulated piece 351 inserted in the sleeve 350 rides under the contact brush 354 and thus interrupts the circuit of the nickel and dime solenoid 100ª.

When a penny engages the penny kicker 110ª and its coacting fixed contact 108ª, the auxiliary coil 372 and the master coil 308 are connected in series, the circuit is as follows—penny kicker 110ª, wire 376 through the coil 372 thence by wire 374 and wires 334 and 332 to one side of the battery 330, thence by wire 328 through the master coil 308, thence by wire 326, through contact brush 324, conducting sleeve 322, contact brush 320, wire 318, contact brush 316, conducting sleeve 314, contact brush 312, wire 310, fixed penny contact 108ª, thus completing the circuit through coils 308 and 372. As above mentioned, the energization of the master coil at the time when a penny contacts with the kicker 110ª will not result in energizing the solenoid 100ª, because its circuit will be broken by the insulated insert 351 in the sleeve 350 striking the brush 354. The upward movement of this insulating sleeve 350 occasioned by the energization of the coil 372 will, however, close a circuit through the penny solenoid coil 124ª. This will result in pulling down the solenoid extension rod 120ª, thus rocking the penny kicker 110ª and thereby transferring the penny to the branch slot. When the auxiliary coil 372 is energized by the presence of a penny between the kicker 110ª and the penny contact 108ª, a circuit will be made through the penny solenoid as follows—from battery 330 through wire 332 and wire 333 through the solenoid 124ª, thence by wire 378 to contact brush 380 which will then be engaged with the conducting part of the sleeve 350 carried on the extension rod 352 of the core of the auxiliary coil 372. From contact sleeve 350, the circuit will be completed through brush 348, wire 346, brush 340, contact sleeve 338, the brush 342 and by wire 344 to the other side of the battery 330.

Upon energization of the penny solenoid 124ª, the insulator sleeve 382 will interrupt the circuit between the brushes 320 and 324 thus breaking the circuit for the master coil 308 through the connections above described, thereby permitting a spring 366 to return the parts to the full line position illustrated. At the same time, a spring will restore the parts actuated by the auxiliary coil 372 to the full line position illustrated.

Each time the solenoid 100ª is energized, the core extension rod 96ª thereof is adapted to advance a counter one unit. Thus, when a nickel is inserted one impulse will be given to the counter and when a dime is inserted two impulses will be given. Such a counter is indicated at 170ª, the same being actuated by a pin 174ª striking the counter arm 172ª. There will be a similar counter 229ª which will be actuated by a pin 231ª each time the penny solenoid 124ª is energized.

From the foregoing, it is clear, therefore, that neither nickels nor dimes are themselves effective to break the circuit. They, therefore, do not tend to draw arcs which might pit the kickers and contacts, hence there is no likelihood of failure of the apparatus to properly register because of pitted or corroded contacts.

The fare box described is particularly adapted for collecting street car and bus fares and while these are usually collected in the form of nickels and dimes it will of course be understood that the reference to coins of this denomination is illustrative rather than limiting, it being understood that the apparatus can be adapted for handling other coins of varying diameters, as well as so-called tokens frequently used for the payment of street railways fares. The fare box can also be used for registering paid admissions to theaters, amusement parks, baseball games and the like.

Various modifications may be made by those skilled in the art without departing from the invention as defined in the appended claims.

What I claim is:—

1. A coin controlled cash fare box comprising a structure providing a main coin slot adapted to receive coins of different diameters, means for arresting the travel of respective coins of different diameters at different points along the length of the slot, said arresting means including movable members, branch slots in said structure and means for actuating said members, so as to transfer respective coins from the main slot to respective branch slots, a counter and means for actuating the counter each time one of said members transfers a coin from the main slot to a branch slot, said movable members having portions which form parts of the boundary of said main coin slots.

2. A coin controlled cash fare box comprising a structure providing a main coin slot adapted to receive coins of different diameters, means for arresting the travel of respective coins of different diameters at different points along the length of the main slot, said arresting means including swingable coin kickers whose free ends form parts of the boundary of said main slot, branch slots in said structure and means for actuating said kickers so as to transfer respective coins from the main slot to respective branch slots, separate coin storage receptacles, means for delivering coins from each branch slot to a respective coin storage receptacle.

3. A coin controlled cash fare box comprising a structure providing a main coin slot adapted to receive coins of several denominations, two separate branch slots opening into the main slot, respective kickers located at different locations along the main slot adjacent said two branch slots and means for actuating said kickers to transfer coins from the main slot to said branch slots, a single counter, and a single member operatively engaging both kickers for transmitting a counting stroke to said counter each time one of said kickers is actuated.

4. A coin controlled cash fare box comprising a structure providing a main coin slot adapted to receive coins of several denominations, nickel and dime branch slots opening into the main slot, contacts at the intersections of the main and branch slots, respective nickel and dime kickers adapted to be connected in circuit with said contacts when a coin engages both, electric power means in circuit with said contact and kicker, and a single kicker moving means coacting with said nickel and dime kickers and operable by said power means and effective to cause the kicker to transfer a coin from said main to one of said branch slots.

5. The fare box of claim 4 including a counter which is actuated each time a kicker transfers a coin from the main to a branch chute.

6. A coin controlled cash fare box comprising a structure providing a main coin slot adapted to receive coins of several denominations, branch slots opening into the main slot each adapted to receive coins of a predetermined denomination, kickers located at different locations along the main slot adjacent said branch slots and means for actuating said kickers to transfer coins from the main slot to said branch slots, a conductor electrically connecting said kickers, contacts defining parts of the branch slots where they intersect the main slot, a conductor electrically connecting said contacts, electric power means connected in a circuit with the kickers and the contacts and means actuated upon energization of said electric power means for transmitting movement to said kickers.

7. A coin controlled cash fare box comprising a pair of spaced plates of insulating material providing a main coin slot and branch coin slots, electric contact members located at the points of intersection between said main and branch slots, movable coin kickers whose extremities lie opposite said contacts, said kickers and contacts being spaced to arrest the travel of coins of different diameters at different points along said main slot, electric power means whose energization is controlled by a circuit normally open across said contacts and said kickers and adapted to be closed when the travel of a coin in the main slot is arrested jointly by one of said contacts and one of said kickers, and means movable in response to the energization of said electric power means for actuating said kickers to effect a transfer of coins from said main slot to said branch slots.

8. The coin box of claim 7 including a counter and means for actuating the counter each time the electric power means is energized.

9. A coin controlled cash fare box comprising a structure providing a main coin slot of varying width at different parts of its length, branch slots leading from said main slot, electrical contacts located at the intersection of said branch slots and the main slot, pivoted kickers arranged to coact with said contacts so as to arrest the travel of coins of different diameters at different points in the length of said slot, one bus bar electrically connecting said contacts and another bus bar electrically connecting said kickers, a solenoid included in a circuit which is normally open across said bus bars and adapted to be closed when the travel of a coin is arrested by one of said contacts and one of said kickers, a counter, a member reciprocated by said solenoid, means on said member for actuating said counter and means operated in response to movements of said member for actuating said kickers so as to transfer any coin engaged therewith from said main slot to an adjacent branch slot.

10. A coin controlled cash fare box comprising a structure providing a main slot having an entrance portion of a size adapted to receive nickels, dimes, or pennies, a nickel contact and a nickel kicker at the upper part of said main slot adapted to arrest the travels of nickels, a nickel branch slot adjacent said nickel contact, a penny contact and penny kicker below the similar members, a penny branch slot adjacent said penny contact, a dime contact and dime kicker below the corresponding penny members, a branch slot looped around said dime contact, a second dime contact and dime kicker below said looped branch, a branch dime slot adjacent said second-mentioned dime contact, electric power means in circuit with said nickel and dime contacts and kickers, a second electric power means in circuit with said penny contact and kickers, a common member for actuating said nickel and dime kickers movable in response to one of said electric power means and a member for actuating said penny kicker responsive to the other electric power means, a counter common to the nickel and dime operating member adapted to be actuated each time the respective nickel and dime kickers are actuated by said electric power means.

11. A coin controlled cash fare box comprising a structure providing a main coin slot adapted to receive coins of different diameters, means for arresting the travel of respective coins of different diameters at different points along the length of the slot, said arresting means including movable members and coin contacts, electric power means for actuating said members, a master coil and an electric current supply in circuit with said contacts and said members, circuit control means actuated by said master coil effective to control the supply of current to said electric power means, and means actuated by said electric power means for interrupting the circuit of said master coil.

12. A coin controlled cash fare box comprising a structure providing a main coin slot adapted to receive coins of different diameters, means for arresting the travel of respective coins of different diameters at different points along the length of the slot, said arresting means including movable members and coin contacts, electric power means for actuating said members, a master coil and an electric current supply in circuit with said contacts and said members, circuit control means actuated by said master coil effective to control the supply of current to said electric power means, and means actuated by said electric power means for interrupting the circuit of said master coil and means actuated by said master coil for establishing an electrical connection across said coin contacts and said movable members when the master coil is energized.

13. A coin controlled cash fare box comprising a structure providing a main coin slot adapted to receive coins of different diameters, means for arresting the travel of respective coins of different diameters at different points along the length of the slot, said arresting means including respective nickel, penny and dime kickers, and coacting nickel, penny and dime contacts, a master coil and an electric current supply in circuit with said several kickers and said contacts, the said circuit being adapted to be closed when a coin is stopped by a kicker and its associated contact, one electric power means and an operating member actuated thereby for moving said nickel and dime kickers, another electric power means and an operating member for moving said penny kicker, a circuit closing device 338 actuated by said master coil controlling the supply of current to both of said electric power means, conductors and means actuated by said master coil for establishing electrical connections across said nickel and dime kickers and their corresponding contacts, respective circuit breaking means actuated by each of the aforesaid operating members adapted to break the circuit of said master coil, an auxiliary coil connected in a circuit with said master coil, said current supply, said penny kicker and said penny contact, means operable by said auxiliary coil effective to normally close a circuit through said first mentioned electric power means and to hold open the circuit through the second mentioned electric power means, said last named means when the auxiliary coil is energized being effective to open the circuit of the first electric power means and close the circuit through the second-named electric power means upon energization of said auxiliary coil.

FRANK P. FRANKFORD.